(12) United States Patent
Lundberg et al.

(10) Patent No.: US 8,888,646 B2
(45) Date of Patent: Nov. 18, 2014

(54) TWO-MODE CONTINUOUSLY VARIABLE TRANSMISSION

(75) Inventors: Philip C. Lundberg, Keego Harbor, MI (US); Andrew W. Phillips, Rochester, MI (US); Edwin T. Grochowski, Howell, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 10 days.

(21) Appl. No.: 13/570,428

(22) Filed: Aug. 9, 2012

(65) Prior Publication Data

US 2013/0130859 A1    May 23, 2013

Related U.S. Application Data

(60) Provisional application No. 61/562,143, filed on Nov. 21, 2011.

(51) Int. Cl.
*F16H 37/06* (2006.01)
*F16H 37/02* (2006.01)

(52) U.S. Cl.
CPC .................................. *F16H 37/022* (2013.01)
USPC .......................................... 475/218; 475/216

(58) Field of Classification Search
None
See application file for complete search history.

(56) References Cited

U.S. PATENT DOCUMENTS

| | | | | |
|---|---|---|---|---|
| 5,980,414 | A * | 11/1999 | Larkin | 475/211 |
| 2007/0060441 | A1 | 3/2007 | Kim et al. | |
| 2007/0275808 | A1 * | 11/2007 | Iwanaka et al. | 475/5 |
| 2009/0131216 | A1 * | 5/2009 | Matsubara et al. | 477/37 |
| 2011/0015012 | A1 | 1/2011 | Kajigaya et al. | |

* cited by examiner

*Primary Examiner* — Erin D Bishop

(57) ABSTRACT

A continuously variable transmission includes a gearbox with two forward modes and a reverse mode. The gearbox includes a plurality of gear members and further includes at least three torque transmitting devices such as, clutches and brakes that are selectively employed to engage various combinations of the gear members such that a particular combination is associated with one of the two forward modes and the reverse mode.

16 Claims, 4 Drawing Sheets

TWO-MODE CONTINUOUSLY VARIABLE TRANSMISSION

RELATED APPLICATION

This application claims the benefit of U.S. Provisional Application No. 61/562,143, filed Nov. 21, 2011, the entire contents of which are incorporated herein by reference.

FIELD

The present invention relates to continuously variable transmissions. More specifically, the present invention relates to continuously variable transmissions with two modes.

BACKGROUND

The statements in this section merely provide background information related to the present disclosure and may or may not constitute prior art.

A continuously variable transmission ("CVT") typically includes gearing that operatively couples a variator between a rotary power source, such as an engine or electric motor, and a final drive unit. The variator includes a rotary input disk and a rotary output disk which are able to steplessly or continuously vary the ratio of an input speed to an output speed (the "variator ratio"). The overall speed ratio provided by the CVT is a function of the variator ratio and the associated gearing. The output disc includes integrally formed gear teeth that are in mesh with and drive a corresponding gear. The gear in turn is functionally coupled to an output shaft or layshaft that is functionally coupled to the final drive unit.

CVT designs typically have a single forward mode which limits the spread of the transmission ratio. Therefore, there is a need in the art for a CVT design that allows for large transmission ratio spreads.

SUMMARY

A continuously variable transmission includes a gearbox with two forward modes and a reverse mode. The gearbox includes a plurality of gear members and further includes at least three torque transmitting devices such as, clutches and brakes that are selectively employed to engage various combinations of the gear members such that a particular combination is associated with one of the two forward modes and the reverse mode.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
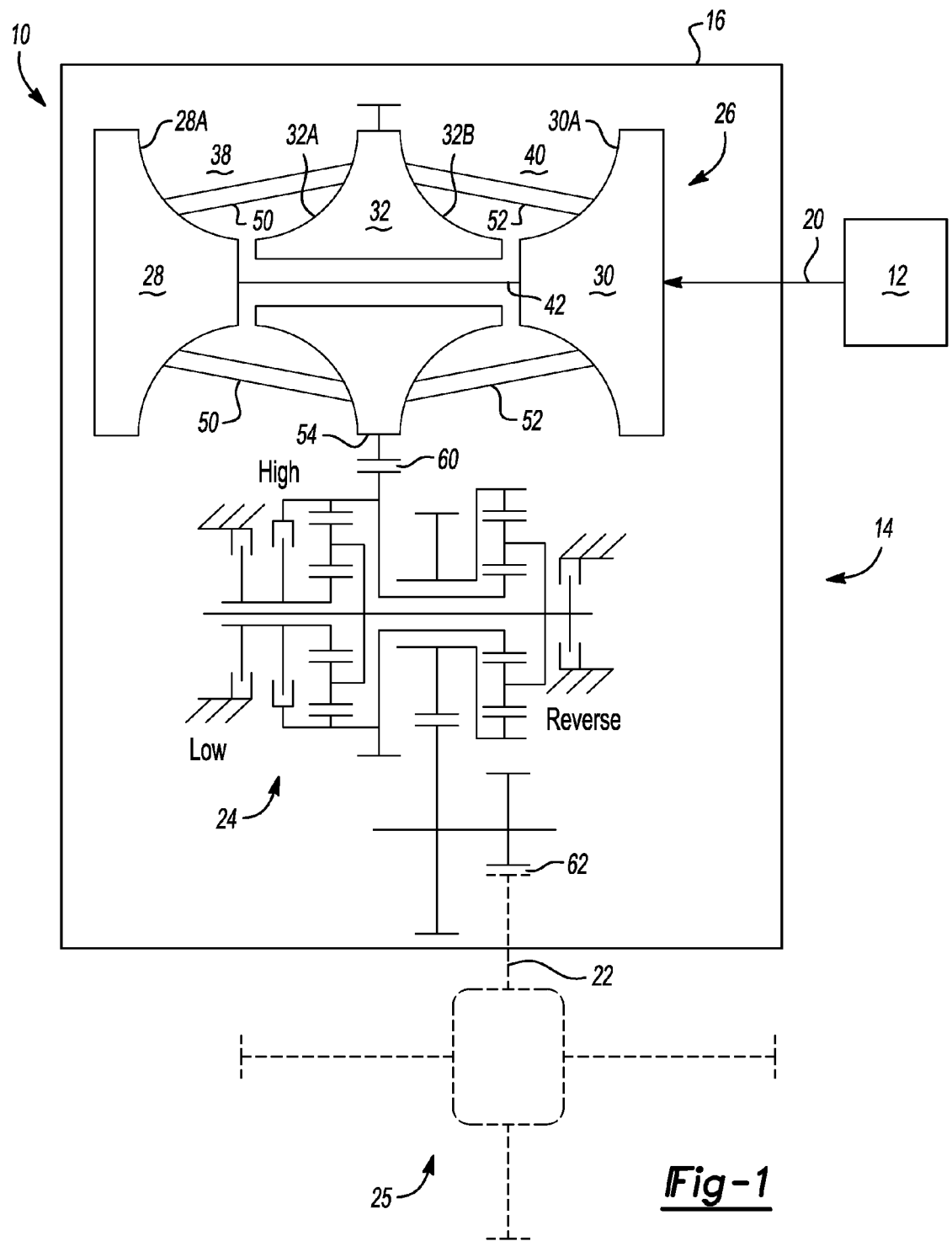
FIG. 1 is a schematic diagram of a powertrain for a motor vehicle in accordance with the principles the present invention.

Referring now to FIG. 1, a powertrain embodying the principles of the present invention is designated as 10. The powertrain 10 generally includes an engine 12 interconnected with a transmission 14. The engine 12 may be a conventional internal combustion engine or an electric motor, or any other type of prime mover, without departing from the scope of the present disclosure. The engine 12 supplies a driving torque to the transmission 14 through, for example, a flexplate or other connecting device or a starting device (not shown) such as a hydrodynamic device or launch clutch.

The transmission 14 is a toroidal-type continuously variable transmission (CVT). The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft 20 and a transmission output shaft 22. Connected between the transmission input shaft 20 and the transmission output shaft 22 is a gearbox 24 configured to provide forward and reverse speed or gear ratios between the transmission input shaft 20 and the transmission output shaft 22 and a variator 26. The transmission input shaft 20 is functionally interconnected with the engine 12 and receives input torque or power from the engine 12. The transmission output shaft 22 is preferably connected with a final drive unit 25 which includes, for example, a propshaft, a differential assembly, and drive axles connected to wheels, etc. The transmission input shaft 20 is coupled to and provides drive torque to the gearbox 24.

The gearbox 24 generally includes one or more gear sets, clutches and/or brakes, and shafts. The variator 26 is illustrated as a toroidal race rolling type variator. However, it should be appreciated that various other types of variators may be employed without departing from the scope of the present invention. The variator 26 includes a first input disc 28 and a second input disc 30. The first input disk 28 includes a toroidal outer surface or first input race 28A and the second input disk 30 includes a toroidal outer surface or second input race 30A. Disposed between the first and second input races 28A, 30A is an output disk 32. The output disk 32 includes a toroidal outer surface or first output race 32A and a toroidal outer surface or second output race 32B. The first output race 32A is disposed opposite the first input race 28A and the second output race 32B is disposed opposite the second input race 30A. The first input race 28A and the first output race 32A cooperate to define a first toroidal cavity 38 and the second input race 30A and the second output race 32B cooperate to define a second toroidal cavity 40. Each of the disks 28, 30, and 32 share a common rotational axis defined by a variator shaft 42. The variator shaft 42 is functionally interconnected to the transmission input shaft 20 and therefore receives drive torque from the engine 12. The input disks 28 and 30 are rotationally coupled to the variator shaft 42 and transfer drive torque to the output disk 32 via a plurality of rollers 50 and 52.

For example, the first cavity 38 includes the plurality of rollers 50 and second cavity 40 includes the plurality of rollers 52. Typically each of the first and second cavities 38 and 40 include two or three rollers 50 and 52, though it should be appreciated that any number of rollers may be employed without departing from the scope of the present invention. Each of the rollers 50, 52 are mounted for rotation about a roller axis and rolls upon the toroidal races 28A, 32A, 32B, and 30A of its associated input and output disks 28, 30, and 32 to transfer torque from the input disks 28 and 30 to the output disks 32. Changes in variator torque ratio are achieved by precession of the rollers 50, 52 such that the roller's axis is able to turn to change the inclination of the roller axis to the variator axis. Precession of the rollers 50, 52 results in changes of the radii of the paths traced upon the races 28A, 32A, 32B, and 30A by the rollers 50, 52 and hence results in a change of variator drive ratio between the input disks 28 and 30 and the output disk 32. A variator output gear 60 is coupled to a distal portion 54. The variator output transfer gear 60 is intermeshed with the gearbox 24. The gearbox 24 is functionally interconnected with the transmission output shaft 22 through an output transfer gear 62 and supplies drive torque from the variator 26 and variator output transfer gear 60 to the transmission output shaft 22 and therefore the final drive unit 25.

The gearbox 24 includes a first planetary gear set 64 and a second planetary gear set 66 positioned about a shaft 63. The first planetary gear set 64 includes a sun gear member 68, a planet gear carrier member 70, and a ring gear member 72. The sun gear member 68 is coupled to the input transfer gear 60 with a first shaft or interconnecting member 74. The ring gear member 72 is coupled to an intermediate transfer gear 76 with a second shaft or interconnecting member 78. The planet gear carrier member 70 is coupled to the shaft 63 and rotatably supports a set of planet gears 80 configured to intermesh with both the sun gear member 68 and the ring gear member 72.

The second planetary gear set 66 includes a sun gear member 82, a planet gear carrier member 84, and a ring gear member 86. The sun gear member 82 is connected to a third shaft or interconnecting member 88, and the ring gear member 86 is connected to a fourth shaft or interconnecting member 90. The planet gear carrier member 84 is coupled to the shaft 63 and rotatably supports a set of planet gears 85 configured to intermesh with both the sun gear member 82 and the ring gear member 86.

Figure 2:
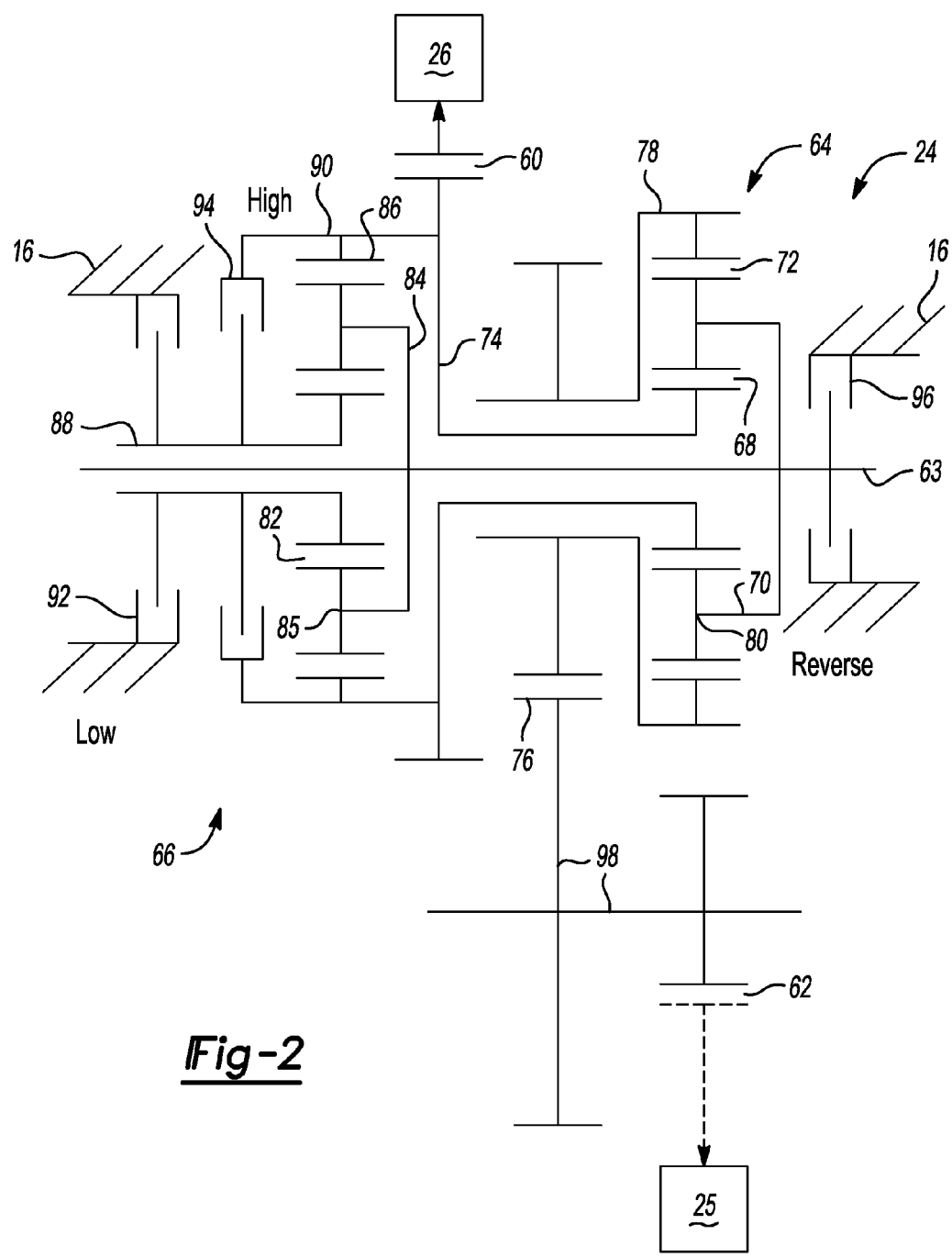
FIG. 2 is a close-up view of a gearbox of the powertrain shown in FIG. 1.

A first torque transmitting member such as, for example, a brake 92 selectively couples the third shaft or interconnecting member 88 to a stationary member or the transmission housing 16. A second torque transmitting member such as, for example, a clutch 94 selectively couples the third shaft or interconnecting member 88 with the fourth shaft or interconnecting member 90. A third torque transmitting member such as, for example, a brake 96 selectively couples the stationary member or the transmission housing 16 to the shaft 63. In the particular implementation shown in FIG. 2, the brake 92 is operated to engage a first forward mode, the clutch 94 is operated to engage a second forward mode, and the brake 96 is operated to engage a reverse mode of the transmission 14.

When the transmission 14 is operated in one of the three modes described above, input torque is transmitted from the variator 26 through the input transfer gear 60 to the gearbox 24. The gearbox 24, in turn, transmits the output torque to the final drive unit 25 through the intermediate transfer gear 76, a shaft or interconnecting member 98, and the output transfer gear 62.

In the reverse mode, the brake 96 is engaged to hold the planet gear carrier member 70 stationary. Input torque is transmitted from the variator 26 through the input transfer gear 60 to the sun gear member 68 via the first shaft or interconnected member 74. Output torque is transmitted from the ring gear member 72 to the intermediate transfer gear 76.

When the transmission 14 is operated in the first forward mode (low mode), the brake 92 is engaged to hold the sun gear member 82 stationary. Input torque is transmitted from the variator 26 through the input transfer gear 60 to the ring gear member 86. Accordingly, the rotational speed of the planet gear carrier member 84, hence is set by planet gears 85, is based on holding the sun gear member 82 and driving the ring gear member 86. As such, the rotational speed of the planet gear carrier member 70 is the same as that of the planet gear carrier member 84, and the output rotational speed of the gearbox 24 is equal to the ratio of the speed of the planet gear carrier member 70 to the speed of the sun gear 68.

When the transmission 14 is operated in the second forward mode (high mode), the clutch 94 is engaged. This couples the ring gear member 86 to the sun gear member 82, such that the set of planet gears 85 has the same rotational speed as that of the planet gear carrier member 84, resulting in the sun gear member 68 having the same rotational speed as the set of planet gears 80.

Figure 3:
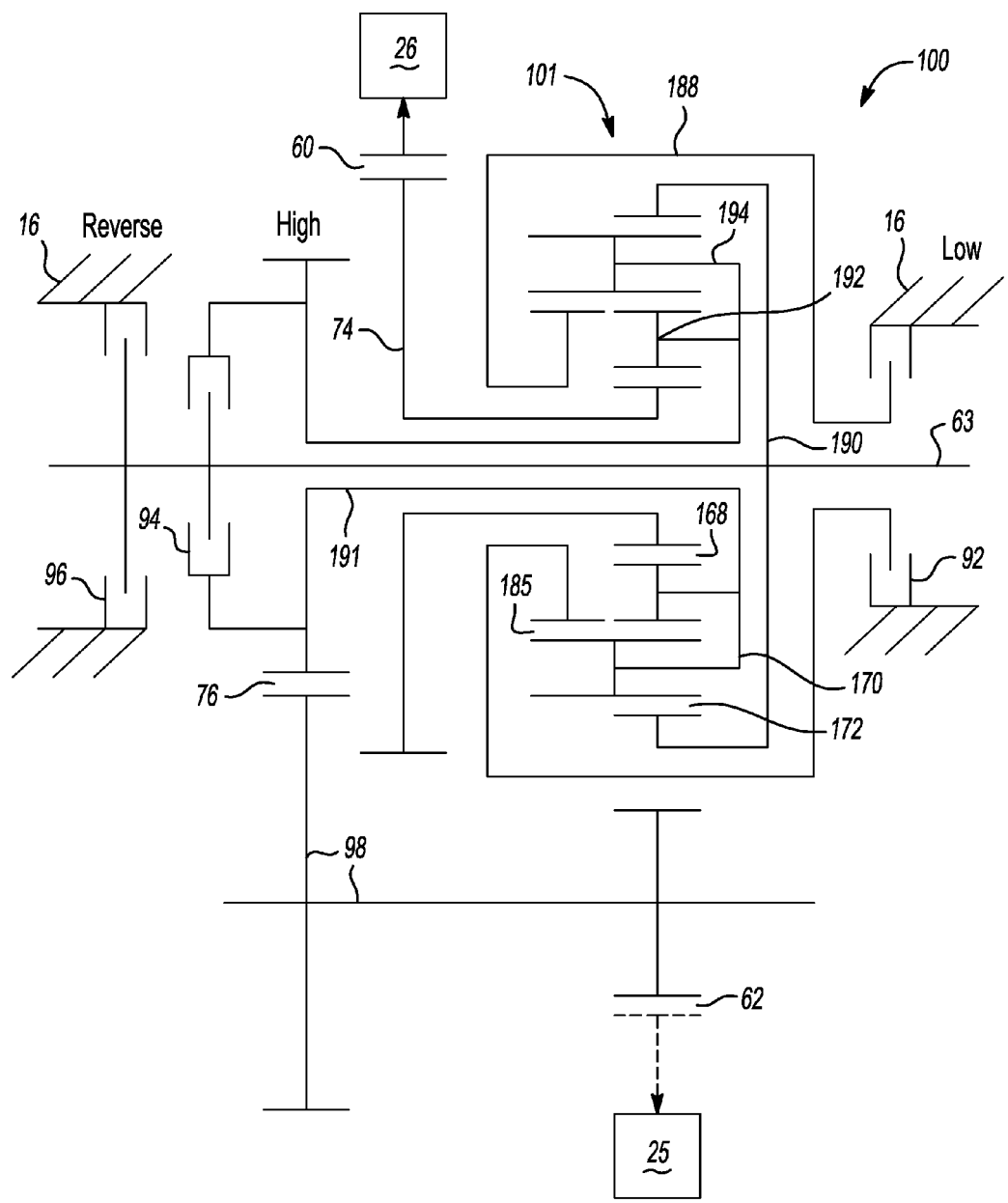
FIG. 3 is a close-up view of alternative gearbox for the powertrain shown in FIG. 1 in accordance with the principles of the present invention.

Referring now to FIG. 3, there is shown an alternative arrangement of a gearbox 100 for the transmission 14. The gearbox 100 includes a planetary gear set 101 positioned about the shaft 63. The planetary gear set 101 includes a ring gear member 172, a first sun gear member 168, a second sun gear member 185, and a carrier member 170. The first sun gear member 168 is coupled to the input transfer gear 60 with the first shaft or interconnecting member 74. The second sun gear member 185 is connected to a second shaft or interconnecting member 188. The ring gear member 172 is coupled to the shaft 63 with a third shaft or interconnecting member 190. The carrier member 170 is coupled to the intermediate transfer gear 76 with a fourth shaft or interconnecting member 191 and rotatably supports a first pinion gear member 192 and a second pinion gear member 194. The first pinion gear member 192 is configured to intermesh with both the first sun gear member 168 and the second pinion gear member 194. The second pinion gear member 194 is configured to intermesh with the ring gear member 172, the second sun gear member 185, and the first pinion gear member 192.

A first torque transmitting member such as, for example, the brake 92 selectively couples the second shaft or interconnecting member 188 to a stationary member or the transmission housing 16. A second torque transmitting member such as, for example, the clutch 94 selectively couples the fourth shaft or interconnecting member 191 with the shaft 63. A third torque transmitting member such as, for example, the brake 96 selectively couples a stationary member or the transmission housing 16 to the shaft 63. In the particular implementation shown in FIG. 3, the brake 92 is operated to engage a first forward mode (low mode), the clutch 94 is operated to engage a second forward mode (high mode), and the brake 96 is operated to engage a reverse mode of the transmission 14.

When the transmission 14 is operated in one of the three modes described above, input torque is transmitted from the variator 26 through the input transfer gear 60 to the gearbox 100. The gearbox 100, in turn, transmits the output torque to the final drive unit 25 through the intermediate transfer gear 76, the shaft or interconnecting member 98, and the output transfer gear 62.

In the reverse mode, the brake 96 is engaged to prevent the ring gear member 172 from rotating. The input torque from the variator 26 is transmitted to the first sun gear member 168, which causes the first pinion gear 192 member and the second pinion gear member 194 to rotate. The second pinion gear 194 member reacts against the stationary ring gear member 172, which causes the carrier member 170, and hence the intermediate transfer gear 76, to rotate.

When the transmission 14 is operated in the first forward mode (low mode), the brake 92 is engaged to couple it to the second sun gear member 185, holding the second sun gear member 185 stationary. Input torque is transmitted from the variator 26 through the input transfer gear 60 to the first sun gear member 168. The rotating first sun gear member 168 rotates the first pinion gear member 192 and the second pinion gear member 194. The pinion gear member 194 reacts against the stationary second sun gear member 185, which causes the carrier member 170, and hence the intermediate transfer gear 76, to rotate.

When the transmission 14 is operated in the second forward mode (high mode), the clutch 94 is engaged. Input torque is transmitted from the variator 26 through the input transfer gear 60 to the first sun gear member 168. The carrier member 170 and the ring gear member 172 are connected together with a rotating clutch. Therefore, the carrier member 170 and the ring gear member 172 rotate together at the same speed as the first sun gear member 168. The rotating carrier member 170 causes the intermediate transfer gear 76 to rotate.

Figure 4:
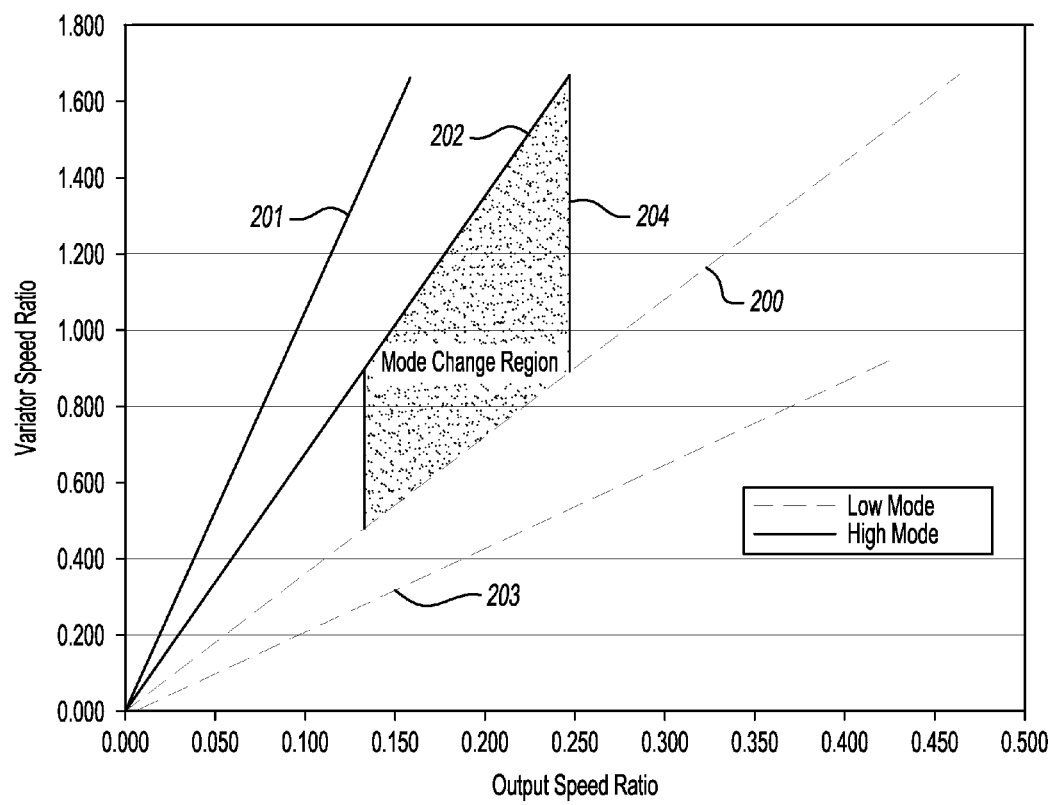
FIG. 4 is graph showing the relationship of the output speed ratio versus the variator speed ratio of the powertrain shown in FIG. 1.

A feature of the two-mode gearboxes 24 and 100 described above is illustrated in FIG. 4, which shows the variator ratio as a function of the transmission ratio. The line 200 and the line 201 are the lower and upper boundaries of the low mode, respectively, while the line 202 and the line 203 are the upper and the lower boundaries of the high mode, respectively, where the region 204 is where the two modes overlap. Hence, one can easily see that the use of the two mode gearboxes greatly expands the performance of the transmission over the use of a single mode. Note that the transmission is not limited to the two gearboxes described above. It will be clear, to those skilled in the art, that there are other ways to arrange gears and clutches to provide the necessary ratios after the variator.

The description of the invention is merely exemplary in nature and variations that do not depart from the gist of the invention are intended to be within the scope of the invention. Such variations are not to be regarded as a departure from the spirit and scope of the invention.

What is claimed is:

1. A two-mode continuously variable transmission (CVT) comprising:
   a variator; and
   a gear box coupled to the variator through an input transfer gear, the gear box including a set of no more than three torque transmitting members including a first torque transmitting member, a second torque transmitting member and a third torque transmitting member, the gear box also including no more than two planetary gear sets including a first planetary gear set with a plurality of gear members and a second planetary gear set with a plurality of gear members, both the first planetary gear set and the second planetary gear set being positioned about a shaft,
   wherein the first torque transmitting member couples the second planetary gear set to a stationary member when the first torque transmitting member is engaged to produce a first forward mode of no more than two forward modes, wherein the second torque transmitting member couples a member of the first planetary gear set to a member of the second planetary gear set when the second torque transmitting member is engaged to produce a second forward mode of the two forward modes, and wherein the third torque transmitting member couples the first planetary gear to the stationary member when the third torque transmitting member is engaged to produce a reverse mode.

2. The two-mode CVT of claim 1 wherein the plurality of gear members of the first planetary gear set includes a sun gear member, a planet gear carrier member, and a ring gear member.

3. The two-mode CVT of claim 2 wherein the sun gear member is coupled to the input transfer gear with a first interconnecting member, the ring gear member is coupled to an intermediate transfer gear with a second interconnecting member, and the planet gear carrier member is coupled to the shaft and supports a first set of planet gears that intermesh with the sun gear member and the ring gear member.

4. The two-mode CVT of claim 3 wherein the plurality of gear members of the second planetary gear set includes a sun gear member, a planet gear carrier member, and a ring gear member.

5. The two-mode CVT of claim 4 wherein the sun gear member of the second planetary gear set is coupled to the input transfer gear with a third interconnecting member, the ring gear member of the second planetary gear set is coupled to a fourth interconnecting member, and the planet gear carrier member of the second planetary gear set is coupled to the shaft and supports a second set of planet gears that intermesh with the sun gear member of the second planetary gear set and the ring gear member of the second planetary gear set.

6. The two-mode CVT of claim 5 wherein when the CVT is operated in the first forward mode of the two forward modes, the first torque transmitting member couples the third interconnecting member to the stationary member to hold the sun gear member of the second planetary gear set stationary so that an input torque is transmitted from the variator through the input transfer gear to the ring gear member of the second planetary gear set.

7. The two-mode CVT of claim 5 wherein when the CVT is operated in the second forward mode of the two forward modes, the second torque transmitting member is engaged to couple two or more gear members of the plurality of gear members of either or both of the first planetary gear set and the second planetary gear set.

8. The two-mode CVT of claim 5 wherein when the CVT is operated in the reverse mode, the third torque transmitting member is engaged to hold the planet gear carrier member of the first planetary gear set stationary such that input torque is transmitted from the variator through the input transfer gear to the sun gear member of the first planetary gear set and output torque is transmitted from the ring gear member of the first planetary gear set to the intermediate transfer gear.

9. The two-mode CVT of claim 1 wherein the first torque transmitting member is a brake, the second torque transmitting member is a clutch, and the third torque transmitting member is a brake.

10. A two-mode continuously variable transmission (CVT) comprising:
    a variator; and
    a gear box coupled to the variator through an input transfer gear, the gear box including only a single planetary gear set with a plurality of gear members, the planetary gear set being positioned about a shaft, the gear box further including no more than three torque transmitting members, the no more than three torque transmitting members including a first brake, a second brake and a clutch, wherein the first brake couples the planetary gear set to a stationary member when the first brake is engaged to produce a first forward mode of no more than two forward modes, wherein the clutch couples the planetary gear set to the shaft when the second torque transmitting member is engaged to produce a second forward mode of the two forward modes, and wherein the second brake couples the shaft to the stationary member when the third torque transmitting member is engaged to produce a reverse mode.

11. The two-mode CVT of claim 10 wherein the plurality of gear members of the planetary gear set includes a first sun gear member, a second sun gear member, a ring gear member, and a carrier member.

12. The two-mode CVT of claim 11 wherein the first sun gear member is coupled to the input transfer gear with a first interconnecting member, the second sun gear member is coupled to a second interconnecting member, the ring gear member is coupled to the shaft with a third interconnecting member, and the carrier member is coupled to an intermediate transfer gear with a fourth interconnecting member, the carrier member rotatably supporting a first pinion gear member and a second pinion gear member.

13. The two-mode CVT of claim 12 wherein the first pinion gear member intermeshes with both the first sun gear member and the second pinion gear member, and the second pinion gear member intermeshes with the ring gear member, the second sun gear member, and the first pinion gear member.

14. The two-mode CVT of claim 12 wherein when the CVT is operated in the first forward mode of the two forward modes, the first brake is engaged to couple the second sun gear member to the stationary member such that input torque is transmitted from the variator through the input transfer gear to the first sun gear member.

15. The two-mode CVT of claim 12 wherein when the CVT is operated in the second forward mode of the two forward modes, the clutch is engaged such that input torque is transmitted from the variator through the input transfer gear to the first sun gear member, and the carrier member is coupled to the ring gear member.

16. The two-mode CVT of claim 12 wherein when the CVT is operated in the reverse mode, the second brake is engaged to hold the ring gear member stationary such that input torque is transmitted from the variator to the first sun gear member such that the first pinion gear member and the second pinion gear member rotate, and the second pinion gear member reacts against the stationary ring gear member such that the carrier member and the intermediate transfer gear rotate.

* * * * *